United States Patent
Nah et al.

(10) Patent No.: US 11,766,729 B2
(45) Date of Patent: Sep. 26, 2023

(54) MOLTEN SOLDER INJECTION HEAD WITH VACUUM FILTER AND DIFFERENTIAL GAUGE SYSTEM

(71) Applicant: International Business Machines Corporation, Armonk, NY (US)

(72) Inventors: Jae-Woong Nah, Closter, NJ (US); John U. Knickerbocker, Monroe, NY (US); Eric P. Lewandowski, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 15/719,451

(22) Filed: Sep. 28, 2017

(65) Prior Publication Data

US 2019/0091786 A1      Mar. 28, 2019

(51) Int. Cl.
*B23K 3/06* (2006.01)
*B23K 3/08* (2006.01)

(52) U.S. Cl.
CPC .............. *B23K 3/0615* (2013.01); *B23K 3/08* (2013.01)

(58) Field of Classification Search
CPC .................................................. B23K 3/0628
See application file for complete search history.

(56) References Cited

U.S. PATENT DOCUMENTS

| | | | | |
|---|---|---|---|---|
| 2,850,901 A | * | 9/1958 | Proctor | G01L 7/04 73/736 |
| 3,169,499 A | * | 2/1965 | Armanno | B23K 1/018 228/20.5 |
| 3,211,354 A | * | 10/1965 | Dugard | B23K 1/018 228/20.5 |
| 3,897,336 A | * | 7/1975 | Bydalek | C22B 9/023 210/773 |
| 4,597,420 A | * | 7/1986 | Schoenthaler | B23K 3/06 141/2 |
| 5,169,128 A | * | 12/1992 | Zabala | B23K 1/085 266/207 |
| 5,244,143 A | | 9/1993 | Ference et al. | |
| 5,274,916 A | * | 1/1994 | Kawabata | H01L 21/481 29/848 |
| 5,284,286 A | * | 2/1994 | Brofman | B22F 3/11 228/119 |

(Continued)

OTHER PUBLICATIONS https://www.wika.us/solutions_differential_pressure_gauges_measure_a_difference_you_can_see_en_us.WIKA "Differential Pressure Gauges Measure a Difference You Can See", Dec. 19, 2016 (Year: 2016).*

(Continued)

*Primary Examiner* — Erin B Saad
*Assistant Examiner* — Carlos J Gamino
(74) *Attorney, Agent, or Firm* — Daniel Morris; Michael J. Chang, LLC (57) ABSTRACT

An improved molten solder injection head having a vacuum filter and differential gauge system is provided. In one aspect, an injection head is provided. The injection head includes: a reservoir; an injection port on a bottom of the injection head connected to the reservoir; a vacuum port adjacent to the injection port on the bottom of the injection head connected to a vacuum source; and a filter disposed between the bottom of the injection head and the vacuum source. A method for molten solder injection using the present injection head is provided.

15 Claims, 11 Drawing Sheets

(56) References Cited

U.S. PATENT DOCUMENTS

| | | | | |
|---|---|---|---|---|
| 5,380,982 | A * | 1/1995 | Fortune | B23K 1/018 219/230 |
| 5,458,281 | A * | 10/1995 | Downing | B23K 1/018 228/264 |
| 5,565,033 | A * | 10/1996 | Gaynes | B23K 3/0692 118/210 |
| 5,673,846 | A * | 10/1997 | Gruber | B23K 35/0222 164/113 |
| 6,231,333 | B1 | 5/2001 | Gruber et al. | |
| 6,344,407 | B1 | 2/2002 | Matsuki et al. | |
| 6,598,292 | B1 * | 7/2003 | Segawa | B41F 15/20 101/126 |
| 6,708,873 | B2 * | 3/2004 | Gruber | H01L 21/486 118/213 |
| 6,783,797 | B2 * | 8/2004 | Bourrieres | B05C 3/18 118/415 |
| 7,066,378 | B2 * | 6/2006 | Pedigo | H05K 3/1233 228/248.1 |
| 7,211,470 | B2 * | 5/2007 | Card | H01L 21/486 257/E21.514 |
| 7,513,410 | B2 * | 4/2009 | Biggs | B23K 3/0623 222/592 |
| 7,980,446 | B2 | 7/2011 | Buchwalter et al. | |
| 8,191,498 | B2 * | 6/2012 | Hein | H05K 3/4053 118/410 |
| 8,376,207 | B2 | 2/2013 | Buchwalter et al. | |
| 8,492,262 | B2 | 7/2013 | Gruber et al. | |
| 9,273,408 | B2 | 3/2016 | Dang et al. | |
| 9,278,401 | B2 | 3/2016 | Biggs et al. | |
| 2005/0218197 | A1 * | 10/2005 | Mochizuki | B23K 1/018 228/264 |
| 2008/0072687 | A1 * | 3/2008 | Hammerand | B01D 46/0086 73/861.52 |
| 2008/0179035 | A1 | 7/2008 | Gruber et al. | |
| 2010/0009070 | A1 * | 1/2010 | Shoji | B23K 3/0638 427/98.6 |
| 2010/0156995 | A1 * | 6/2010 | Kanda | B41J 2/14 347/54 |
| 2011/0079632 | A1 | 4/2011 | Chey et al. | |
| 2013/0105558 | A1 * | 5/2013 | Abe | H01L 24/81 228/179.1 |
| 2014/0224860 | A1 * | 8/2014 | Biggs | B23K 3/0607 228/33 |

OTHER PUBLICATIONS davisac.com, "Air Filters: Understanding Their Function and How to Choose the Right One", Feb. 4, 2015 (Year: 2015).*

P.A. Gruber et al., "Injection molded solder technology for Pb-free wafer bumping," 54th Electronic Components and Technology Conference, Jun. 2004, vol. 1, pp. 650-654.

* cited by examiner

MOLTEN SOLDER INJECTION HEAD WITH VACUUM FILTER AND DIFFERENTIAL GAUGE SYSTEM

FIELD OF THE INVENTION

The present invention relates to injection molded solder (IMS) techniques, and more particularly, to an improved molten solder injection head having a vacuum filter and differential gauge system.

BACKGROUND OF THE INVENTION

With injection molded solder or IMS techniques, bulk solder melted within a solder head is dispensed into cavities or other features of a workpiece as the solder head is scanned across the surface of the workpiece. See, for example, U.S. Pat. No. 8,376,207 issued to Buchwalter et al., entitled "Micro-Fluidic Injection Molded Solder (IMS)" (hereinafter "U.S. Pat. No. 8,376,207"). During operation, the head must precisely deposit solder into the cavities and not leak as it scans the surface of the workpiece. For instance, U.S. Pat. No. 8,376,207 provides a solder head having a slot with an elongate rectangular shape that locally opens to dispense solder only when the slot is over a cavity. One drawback to this design, however, is that it is difficult to fill high aspect ratio features such as high aspect ratio vias (i.e., vias with a high depth to width ratio).

To aid in filling the features, a vacuum can be implemented in front of the liquid solder injection slot. See, for example, U.S. Pat. No. 6,231,333 issued to Gruber et al., entitled "Apparatus and Method for Vacuum Injection Molding" (hereinafter "U.S. Pat. No. 6,231,333"). A link between the vacuum and the liquid injection slots permits continuous gas evacuation during scanning. While surface tension of the liquid can generally serve to prevent flow of the liquid from the injection to the vacuum slots, any surfaces of the workpiece that are not flat (e.g., due to slight warping) can in practice result in the liquid solder being drawn into the vacuum slot which causes clogging that weakens the vacuum force. Monitoring the system vacuum globally makes it difficult to accurately ascertain the vacuum drop from clogging, and cleaning the vacuum lines requires disassembly of the head which is time and cost consuming.

Therefore, improved molten solder injection head designs and techniques for use thereof would be desirable.

SUMMARY OF THE INVENTION

The present invention provides an improved molten solder injection head having a vacuum filter and differential gauge system. In one aspect of the invention, an injection head is provided. The injection head includes: a reservoir; an injection port on a bottom of the injection head connected to the reservoir; a vacuum port adjacent to the injection port on the bottom of the injection head connected to a vacuum source; and a filter disposed between the bottom of the injection head and the vacuum source.

In another aspect of the invention, a method for molten solder injection is provided. The method includes: scanning an injection head across a workpiece having features therein, wherein the injection head includes: a reservoir, an injection port on a bottom of the injection head connected to the reservoir, a vacuum port adjacent to the injection port on the bottom of the injection head connected to a vacuum source, and a filter disposed between the bottom of the injection head and the vacuum source, wherein the reservoir contains molten solder, and wherein the scanning involves evacuating the features using the vacuum port and filling the features with the molten solder using the injection port; monitoring vacuum strength at the injection head during the scanning; and cleaning the filter when the vacuum strength is out of range.

A more complete understanding of the present invention, as well as further features and advantages of the present invention, will be obtained by reference to the following detailed description and drawings.

DETAILED DESCRIPTION OF PREFERRED EMBODIMENTS

Provided herein are improved molten solder injection head designs that enable efficient and effective filling of features such as high aspect ratio vias using a vacuum system with filter(s) to minimize clogging and a differential vacuum gauge system that provides a more accurate reading of the vacuum force. Advantageously, also provided herein are molten solder injection head designs that eliminate direct pathways between the injection and vacuum ports thereby minimizing clogging of the vacuum lines with molten solder. Also provided herein are techniques for easily cleaning the vacuum filter of trapped solder without the need to remove the head from the system and/or disassemble it in any way thereby realizing a significant time savings.

Figure 1:
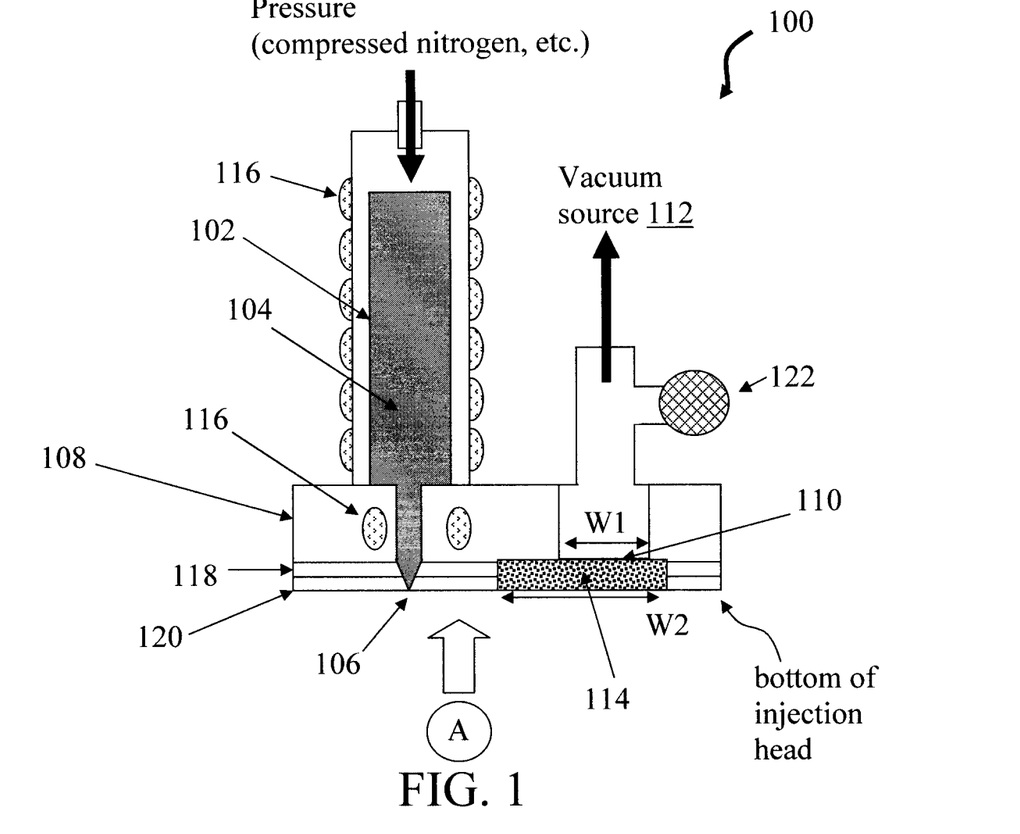
FIG. 1 is a cross-sectional diagram illustrating one exemplary configuration of the present molten solder injection head design according to an embodiment of the present invention.
Figure 2:
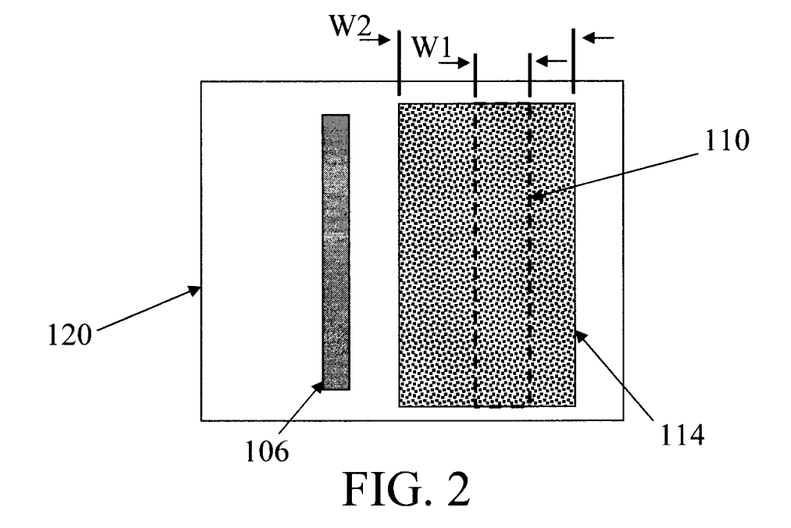
FIG. 2 is a bottom-view diagram of the molten solder injection head design of FIG. 1 according to an embodiment of the present invention.

One exemplary configuration of the present molten solder injection head design is illustrated in FIG. 1 (cross-sectional view) and FIG. 2 (bottom view—i.e., from vantage point A in FIG. 1). As shown in FIG. 1, molten solder injection head 100 includes a reservoir 102 for molten solder 104 fluidly connected to a molten solder injection port 106. Offset from the injection port in the head housing 108 is a vacuum port 110 connected to a vacuum source 112. The vacuum source 112 might simply be a vacuum pump or compressed air flowing through orifices. The vacuum source 112 can generate a system-wide vacuum used, for example, for differential vacuum pressure sensing (see below), to operate multiple injection heads, etc. and thus may also be referred to herein as a "system vacuum." At least one filter 114 is disposed between the bottom of the injection head and the vacuum source 112. In this particular example, the filter 114 is disposed on the bottom of the injection head covering the vacuum port 110. However, embodiments are provided herein where the filter 114 is placed at different locations such as between the vacuum port 110 and the vacuum source 112. A gauge 122 can be used to monitor vacuum pressure at the vacuum port 110. An exemplary configuration employing differential pressure gauges to accurately discern the system vacuum from atmospheric pressure is provided below.

The filter 114 is preferably formed from a heat resistant material but has a porous microstructure that allows air flow, but does not allow molten solder 104 to flow therethrough. Depending on the type of solder being employed, suitable (non-wetting) filters include, but are not limited to, ceramic, polymer, glass, and metal filters. By way of example only, a suitable filter 114 can be a porous copper block having a small pore size (i.e., a pore size of from about 10 micrometers (μm) to about 50 μm, and ranges therebetween). A glass or ceramic filter is composed of interwoven glass or ceramic fibers. Glass fiber filters are available, for example, from Sterlitech Corporation, Kent, Wash. Polymer including plastic filters and membranes are available, for example, from Corning Incorporated, Corning, N.Y. By way of example only, the injection head housing 108 can be formed from metal for durability.

During operation, the reservoir 102 is pressurized (e.g., with a compressed gas such as nitrogen) which forces the molten solder 104 towards the molten solder injection port 106. Heaters 116 located throughout injection head 100 such as adjacent to the injection port (and optionally adjacent to the vacuum port—see below) serve to keep the solder molten. As the injection head 100 is scanned over the surface of a workpiece (see below), the vacuum port 110 first passes over a feature and draws a vacuum. The injection port 106 then passes over the feature and deposits molten solder 104 into the feature. Any molten solder 104 drawn toward the vacuum port 110 (due, for example, to an uneven workpiece surface) is caught by the filter 114 and prevented from entering the vacuum port 110.

In this particular example, the injection port 106 is formed from a conformable material 118 and a low friction material 120 which are configured, in cross-section, to give the injection port 106 an inverted triangular shape. This inverted triangular shape and conformable material 118 ensures that when the injection head 100 is supported by a surface of the underlying workpiece, the injection port 106 is closed off, preventing flow of molten solder 104 out of the injection port 106. However, when the injection port 106 passes over a feature in the workpiece surface, the force provided by the pressurized reservoir 102 and the lack of support at the workpiece surface (due to the injection port 106 being over the feature), the injection port 106 opens and permits molten solder 104 to pass therethrough. When that happens, the vacuum aids the molten solder 104 in being drawn into the feature.

The low friction material 120 aids in scanning the injection head 100 over the surface of the workpiece. Suitable conformable materials 118 include, but are not limited to, low durometer pure silicone rubber and/or silicone closed cell sponge. Suitable low friction materials 120 include, but are not limited to, fluoropolymers such as Teflon™ available from E. I. Du Pont De Nemours And Company, Wilmington, Del., fiberglass reinforced Teflon™, and/or Rulon™ TFE Fluorocarbon available from Saint-Grobain Performance Plastics Corporation, Aurora, Ohio. According to an exemplary embodiment, the low friction material 120 is a reinforced Teflon™ tape applied to the outer surface of the conformable material 118.

As shown in FIG. 1, the vacuum port 110 has a width W1 and the filter 114 has a different width W2, with W2 preferably being larger than W1, i.e., W2>W1. This configuration of the filter 114 being larger than the vacuum port 110 insures that, during operation, the filter 114 does not get sucked up into the vacuum port 110. Advantageously, the presence of the filter 114 at the vacuum port 110 allows for a wider vacuum port (W2) as compared to conventional designs since the filter 114 is there to prevent any molten solder 104 from being drawn in to the vacuum port 110. Increasing the dimensions of the vacuum port 110 allows for an increase in the vacuum force applied to the workpiece. A stronger vacuum force permits more reliable filling of the features of the workpiece including high aspect ratio features such as high aspect ratio vias.

Also, unlike the injection port 106, the vacuum port 110 in this design does not need a conformable material since the filter 114 is present between the injection port 106 and the vacuum port 110 to catch any molten solder 104. Namely, a conformable material at the vacuum port 110 can be used to seal the vacuum port 110 to the workpiece, thereby preventing solder 104 from being drawn into the vacuum lines. Here however, the filter 114 is present at the workpiece surface to catch the molten solder 104. As will be described in detail below, damage to the low friction material 120 during use can create direct mechanical pathways between the injection and vacuum ports 106 and 110, and thus a direct path for molten solder 104 between the ports. Applying more pressure to the injection head 100 can help better seal the head to the workpiece. However, an improved design for the bottom of the injection head 100 is provided herein where stress is concentrated near the injection and vacuum ports 106 and 110 by minimizing the area of the conformable material 118 around the ports. This design will be described in detail below.

Another notable advantage to the present injection head design 100 is that the filter 114 is located at the bottom of the injection head 100 and thus is easily reached without having to disassemble the injection head 100 to access the filter 114. Thus, if and when it comes time to replace the filter 114, the old filter can be easily removed from the bottom of the injection head 100 and replaced with a new one without taking apart any of the injection head 100. As also will be described in detail below, placement of the filter 114 at the bottom of the injection head 100 allows for a maintenance process to be used to clean the filter 114 (e.g., with a heater and solder wick) without even having to remove the injection head 100 from the system, thereby minimizing the number of times the filter 114 has to be replaced.

FIG. 2 provides a view of the bottom of the injection head 100 (i.e., from vantage point A—see FIG. 1). The injection port 106 and adjacent filter 114 over the vacuum port 110 (which is covered by the filter 114 and thus represented using a dotted line) are shown in the depiction in FIG. 2. As shown in FIG. 2, the injection port 106 and the vacuum port 110 are formed from parallel slots along the bottom of the injection head 100.

Figure 3:
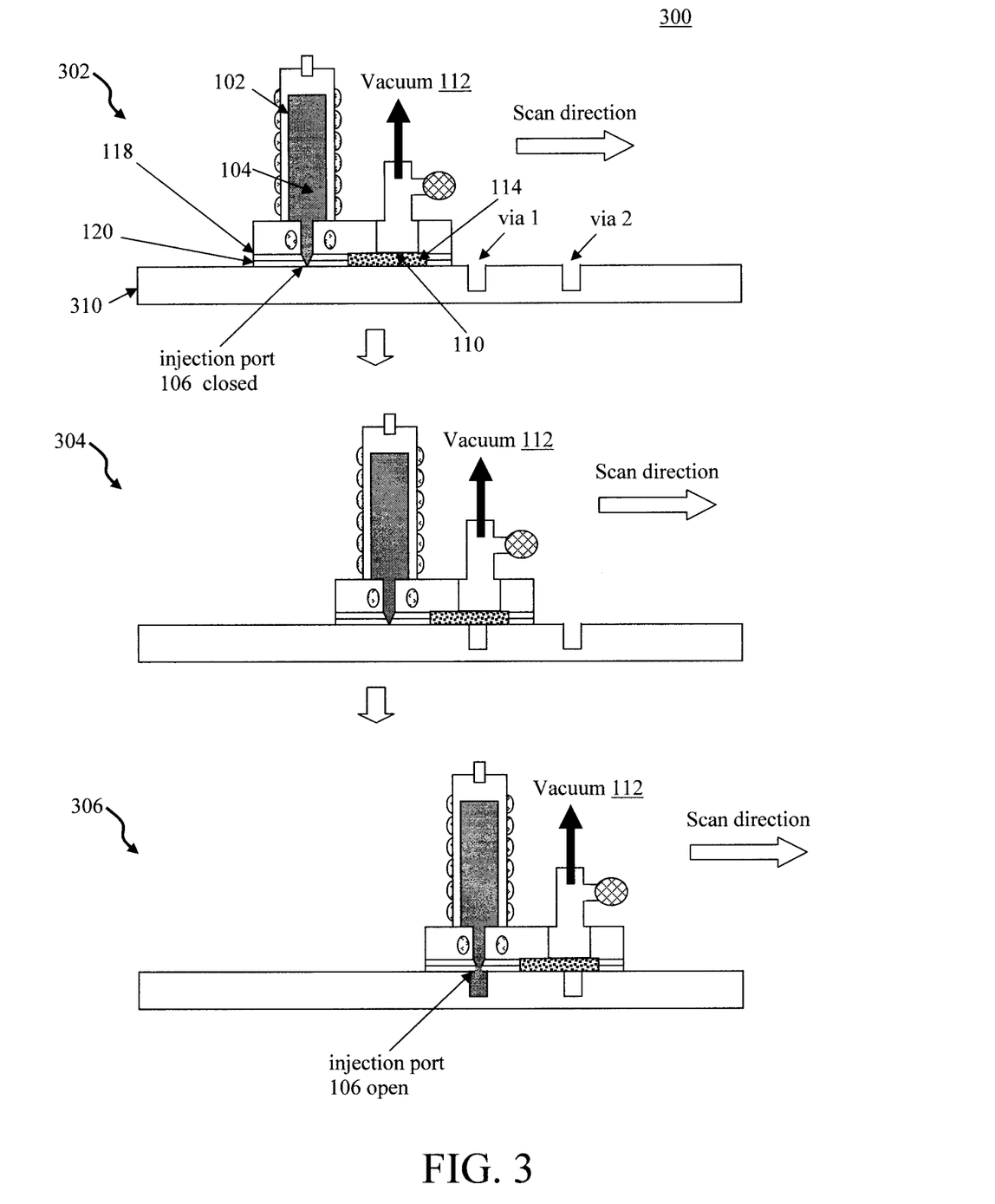
FIG. 3 is a diagram illustrating an exemplary methodology for using the present injection head for molten solder injection according to an embodiment of the present invention.

FIG. 3 is a diagram illustrating an exemplary methodology 300 for using the present injection head for IMS processing of a workpiece. In step 302, the injection head is in contact with a surface of a workpiece 310. At this stage in the process, the surface of the workpiece 310 in contact with the bottom of the injection head is flat beneath the injection port 106 (supporting the conformable material 118) and thus the injection port 106 is closed preventing molten solder 104 from exiting the reservoir 102 through the injection port 106.

The injection head will be scanned across the surface of the workpiece 310 in the scan direction indicated with an arrow, in this example from left to right on the page. In the path of the direction of scan are two features, i.e., via 1 and via 2. Based on the direction of scan, the vacuum port 110 will pass over a given feature before the injection port 106, thus permitting a vacuum to be drawn in the feature prior to dispensing the molten solder 104 into the feature.

Namely, as shown in step 304 the vacuum port 110 first passes over a first feature, i.e., via 1. The vacuum port 110 draws a vacuum in via 1. The injection port 106 is still fully supported by a flat surface of the workpiece 310, and thus remains closed. However, as the injection head is scanned over the surface of the workpiece 310, the injection port 106 next passes over the (evacuated) via 1. Once over this feature, the injection port 106 (which had been pressed closed against the surface of the workpiece 310) now opens permitting molten solder 104 to fill the via 1. See step 306. The operation of this type of injection port is described, for example, in U.S. Pat. No. 8,376,207, the contents of which are incorporated by reference as if fully set forth herein.

According to this particular example, in step 306 the vacuum port 110 is now over the second feature, i.e., via 2. As such, a vacuum will be drawn on via 2 while molten solder 104 is being injected into via 1. Any irregularity and/or warping at the surface of the workpiece 310 can undesirably cause molten solder 104 at the first feature (via 1) to be drawn toward the vacuum port 110 via the vacuum. Advantageously however, the filter 114 is present between the vacuum port 110 and the injection port 106 and/or workpiece 310 to capture any molten solder 104 drawn toward the vacuum port 110. As provided above, the filter 114 has a porous microstructure that allows air flow, but does not allow molten solder 104 to flow therethrough.

Since the vacuum is drawn through the filter 114, inevitably any molten solder 104 trapped by the filter 114 will affect (i.e., reduce) the strength of the vacuum force. Over time as more molten solder 104 gets trapped in the filter 114, the filter 114 will need to be cleaned or replaced. Advantageously, improved techniques are provided herein for monitoring the vacuum force using a differential vacuum gauge system upstream from the filter that more accurately monitors the vacuum just before the vacuum enters the injection head, thereby eliminating false positive readings from simply monitoring the global system vacuum—see below.

A variety of different filter placement schemes are anticipated herein. For instance, in the above example, the filter 114 is located at the bottom of the injection head between the vacuum port 110 and the workpiece 310. However, according to another exemplary embodiment, the filter 414 is located downstream from the vacuum port 410, i.e., between the vacuum port 410 and the vacuum source 412—see injection head 400 of FIG. 4 (cross-sectional view).

Figure 4:
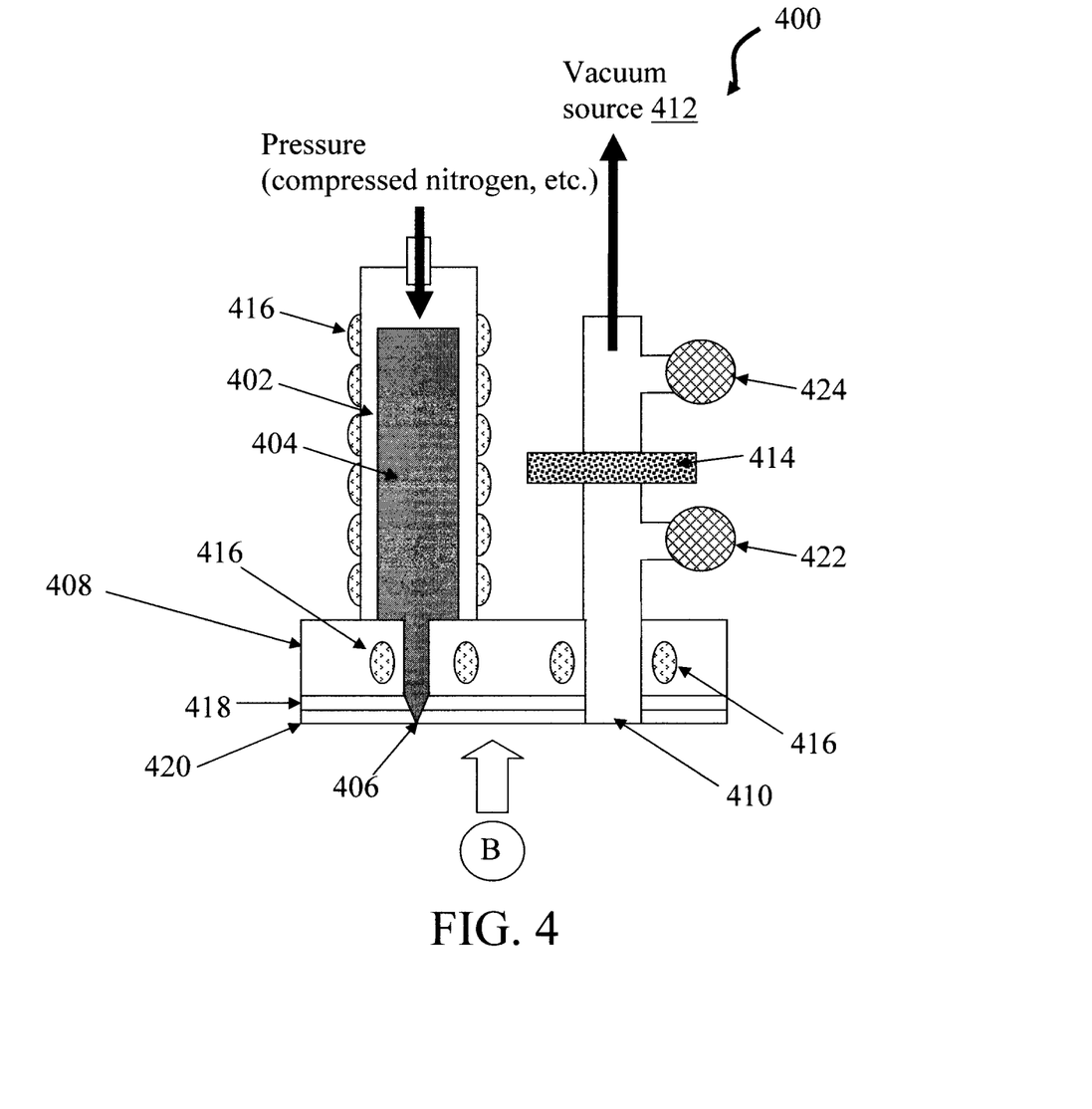
FIG. 4 is a cross-sectional diagram illustrating another exemplary configuration of the present molten solder injection head design according to an embodiment of the present invention.

As shown in FIG. 4, molten solder injection head 400 includes a reservoir 402 for molten solder 404 fluidly connected to a molten solder injection port 406. Offset from the injection port 406 in the head housing 408 is a vacuum port 410 connected to a vacuum source 412. At least one filter 414 is disposed between the vacuum port 410 and the vacuum source 412. As above, the injection port 406 is formed from a conformable material 418 and a low friction material 420 which are configured, in cross-section, to give the injection port 406 an inverted triangular shape.

The terms "upstream" and "downstream" are used herein to describe the relative placement of components along the vacuum stream starting at the surface of the workpiece and ending at the vacuum source. Thus to use an illustrative example, in FIG. 4 the vacuum port 410 is upstream of the filter 414/the filter 414 is downstream from the vacuum port 410, and the filter 414 is upstream of the vacuum source 412.

There are some notable features about this downstream filter embodiment. First, heaters 416 are optionally included adjacent to the vacuum port 410. This is to prevent any molten solder 404 drawn into the vacuum port 410 from solidifying in the vacuum port 410. Namely, any solder inadvertently entering the vacuum lines should remain molten until it reaches the downstream filter 414. Second, locating the filter 414 further downstream enables a differential vacuum gauge system to be employed on both sides of the filter. See FIG. 4 wherein a first vacuum gauge 1 422 is present upstream of the filter 414 and a second vacuum gauge 424 is present downstream from the filter 414. This vacuum gauge configuration permits an accurate assessment to be made of the pressure drop across the filter 414. Thus if/when the filter 414 traps solder 404, the resulting drop in pressure across the filter 414 will be easily determined via the first and second vacuum gauges 422 and 424.

Like the design in FIG. 1 above, the filter 414 for injection head 400 can be easily replaced once it becomes clogged with solder. Replacing the filter 414 can be accomplished without any disassembly of the injection head 400.

It is notable that the injection head designs and filter placement options illustrated, for example, in FIGS. 1 and 4 are not mutually exclusive. For instance, embodiments are anticipated herein where the multiple filters are employed in a single injection head, such as one filter at the bottom of the injection head (as in FIG. 1) and another filter downstream from the vacuum port (as in FIG. 4).

Figure 5:
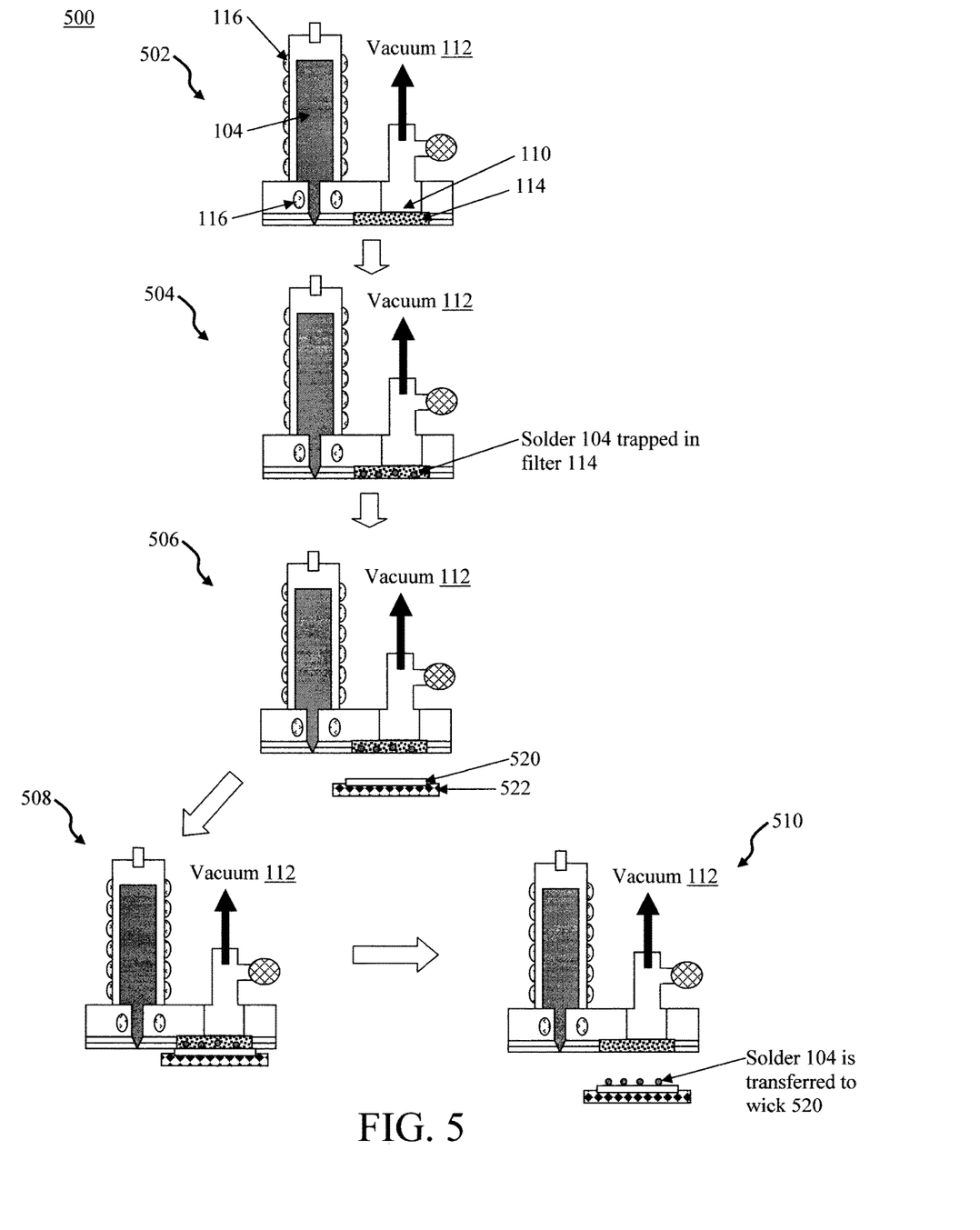
FIG. 5 is a diagram illustrating an exemplary methodology for cleaning the filter without having to remove the injection head from the system according to an embodiment of the present invention.

During operation, the molten solder injection is often performed in a low oxygen environment. Physical replacement of the filter requires opening the system and handling the injection head to access the filter. Once the filter is replaced and the injection head is back in operation, it will take time for the low oxygen environment to be reached again. Thus, techniques for prolonging the life of the filter before it needs replacing would be advantageous. FIG. 5 is a diagram illustrating an exemplary methodology 500 for cleaning the filter without having to remove the injection head from the system. For illustrative purposes only, the injection head 100 design of FIG. 1 is used in the present example, and like structures are numbered alike in the drawings and in the following description. Cleaning the filter extends the time between replacements and thus reduces the amount of time the system is down for servicing.

As shown in step 502, the filter 114 is present on the bottom of the injection head in front of the vacuum port 110 and as shown in step 504, during normal operation (see methodology 300 of FIG. 3 above), the filter 114 traps and prevents solder 104 from entering the vacuum lines. Without cleaning, the amount of trapped solder 104 in the filter 114 will increase, eventually clogging the filter 114 and significantly decreasing the vacuum force.

However, in step 506 a (heated) solder wick 520 is introduced into the system to remove the trapped solder 104 from the filter 114. According to an exemplary embodiment, the solder wick 520 is formed from a highly wetting material such as a material having a high energy surface or a material coated in flux. A high energy surface can be created, for example, by plasma treating the solder wick 520.

Preferably, the solder wick 520 is configured to maximize its surface area which, in the case of a wick coated in flux, helps draw the flux into the solder wick via capillary action. Possible wick geometries to maximize surface area include, but are not limited to, a braided wick material and/or a wick material having pores such as a porous copper block having a small pore size, i.e., a pore size of from about 10 µm to about 50 µm, and ranges therebetween.

To be able to remove solder 104 from the filter 114, the solder wick 520 has to be at a temperature that is higher than the melting temperature of the solder 104 while the injection head temperature is lower than the melting temperature of the solder 104. That way, the solder 104 will transfer from the filter 114 to the solder wick 520. As provided above, the temperature of the injection head can be regulated using the one or more heaters 116 provided therein. As shown in step 506, the temperature of the solder wick 520 is controlled via a heater 522 in contact with the solder wick 520 (and thus also referred to herein as the solder wick heater).

As shown in step 508, the filter 114 is contacted with the (heated) solder wick 520 and, as shown in step 510, the solder 104 is transferred from the filter 114 to the solder wick 520. The solder wick 520 is removed from the system and molten solder injection with the now-cleaned filter 114 can recommence.

According to an exemplary embodiment, the above-described cleaning process is repeated at certain intervals with a new wick. In that case, it is possible to forgo replacing the filter entirely and thus avoiding any down time associated with opening the system and handling the injection head.

As highlighted above, the bottom of the injection head can include a conformable material covered with a low friction material which reduces friction as the injection head is dragged over the workpiece. The conformable/low friction material can, in some cases cover the bottom of the injection head including the injection/vacuum ports and the field therebetween. Take for instance, the head design shown in FIG. 4. The injection port 406 and the vacuum port 410 are parallel to one another along the bottom of the injection head. The conformable and low friction materials 418 and 420 can simply be present on the entire bottom of the injection head with openings therein for each of the ports. During scanning, the conformable material 418 distributes the load and, along with the low friction material 420, acts as a seal to the workpiece. The conformable/low friction material 418 and 420 in the field between the injection and vacuum ports 406 and 410 will keep the newly evacuated features under vacuum until the injection port 406 passes the features and fills them.

A potential drawback to this design, however, is that the low friction material (such as a reinforced Teflon™ tape) is oftentimes not entirely smooth and can get damaged during use, thereby forming a direct mechanical communication path between the vacuum port and the injection port through which solder can migrate. As solder begins to get trapped at the vacuum port this problem will get worse. Ideally, one would like to eliminate direct communication between the two (injection/vacuum) ports. This is difficult because the pressure distribution at and between the ports needs to be finely tuned so as to prevent leakage of the solder but still maintain vacuum in the workpiece features.

Figure 6:
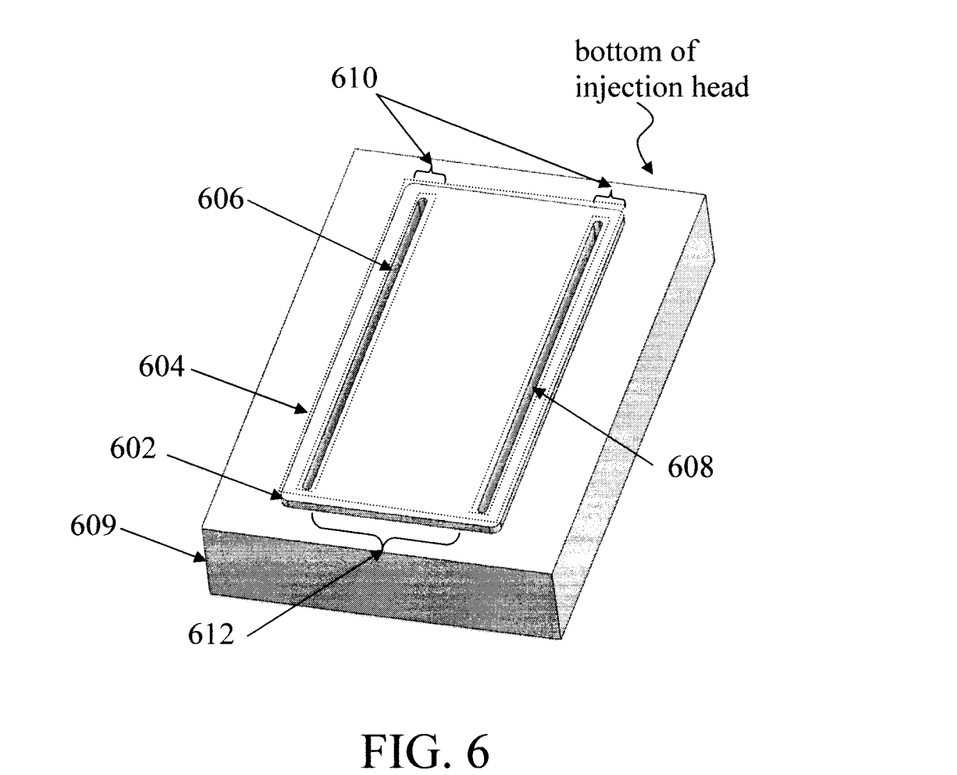
FIG. 6 is a diagram illustrating a conformable material surrounding both the injection and vacuum ports on the bottom of the injection head according to an embodiment of the present invention.

To increase the sealing around the solder, increased pressure can be used to press the injection head to the workpiece. However, an easier and more effective way of accomplishing this without adding more force is by altering the stress distribution in the conformable material so as to concentrate even more stress near the (injection/vacuum) ports by minimizing an area of the conformable material in contact with the workpiece. See for example FIG. 6 which depicts, according to an exemplary embodiment, a design for the bottom of the injection head that is configured to minimize contact area between the conformable material and the workpiece. FIG. 6 provides a view of the bottom of the injection head (i.e., from vantage point B—see for example injection head 400 of FIG. 4). FIG. 6, however, depicts a variation in the design of the bottom of the injection head from injection head 400. FIG. 6 presents a view of the bottom of the injection head housing 609.

Namely, as shown in FIG. 6 a conformable material 602 (and low-friction material 604 thereon) surrounds both the injection port 606 and vacuum port 608 on the bottom of the injection head. However, in the exemplary embodiment illustrated in FIG. 6 the conformable material 602 is confined to the areas 610 immediately surrounding the (injection/vacuum) ports 606 and 608 and the field 612 between the ports. To look at it another way, the conformable material 602 does not cover the entire bottom of the injection head, but only a portion thereof surrounding/between the ports (compare with the configuration shown, for example, in FIG. 4). By reducing the size of the conformable material, the contact area between the conformable material and the workpiece surface is reduced thereby concentrating the stress near the ports and achieving a more effective seal. The low friction material 604 is present over the conformable material 602 and, as shown in FIG. 6, has a same shape and dimensions as the conformable material 602.

Figure 7:
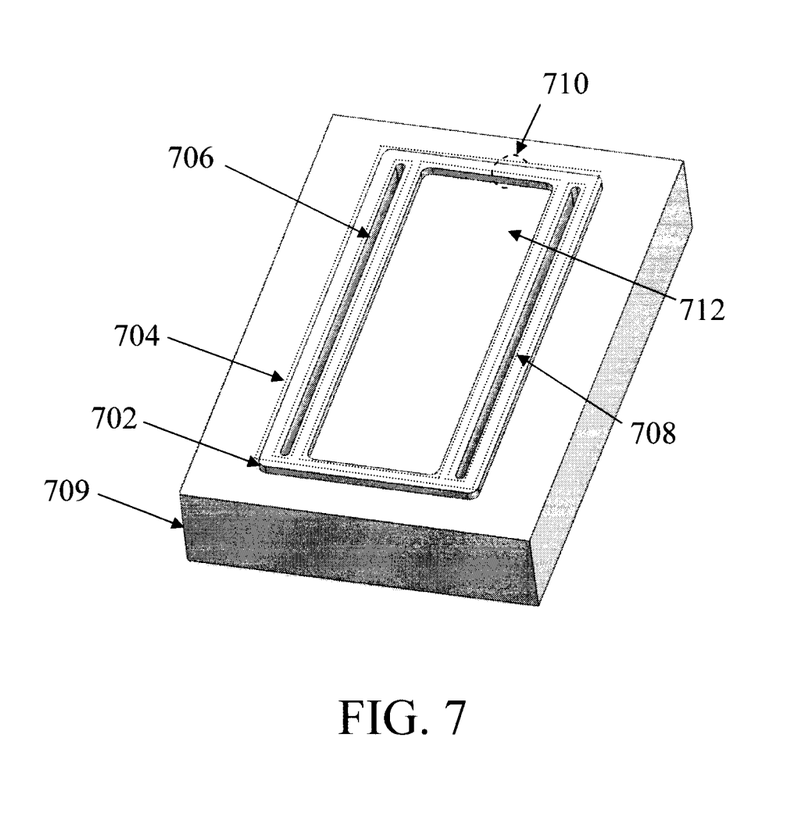
FIG. 7 is a diagram illustrating the conformable material configured as a continuous ridge surrounding both the injection and vacuum ports and a compartment in the field between the ports on the bottom of the injection head according to an embodiment of the present invention.

As a variation to this design, a compartment (e.g., compartment 712—see below) can be added in the field between the ports in order to further reduce the contact area but still maintain a vacuum between the ports during operation. See FIG. 7. FIG. 7 represents a same view of the bottom of the injection head as FIG. 6. Namely, as shown in FIG. 7 the conformable/low friction material 702 and 704 forms a continuous ridge 710 surrounding each of the injection/vacuum ports and the field in between the ports. According to an exemplary embodiment, the compartment 712 is simply the portion of the field between the injection/vacuum ports 706 and 708 that is surrounded by the ridge 710. In that case, what is visible within the compartment 712 in FIG. 7 is the underlying injection head (e.g., metal) housing 709 that is recessed relative to the ridge 710. By eliminating a portion of the conformable/low friction material 702 and 704 from the field between the ports, i.e., corresponding to the compartment 712 (compare FIG. 6 and FIG. 7), the contact area between the conformable material/low friction material 702 and 704 and the workpiece surface is further reduced, thereby further concentrating the stress near the injection and vacuum ports 706 and 708.

Figure 8:
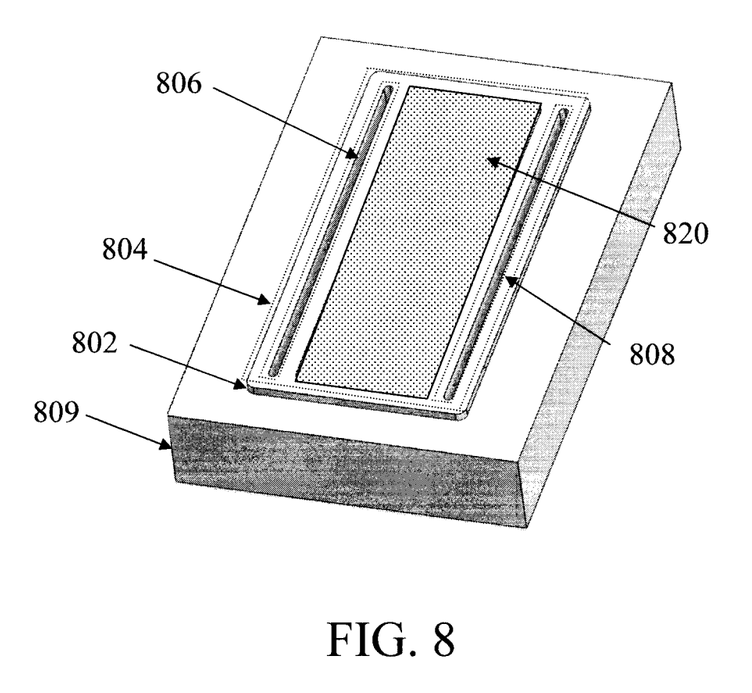
FIG. 8 is a diagram illustrating a different conformable material having been added to the compartment according to an embodiment of the present invention.

Yet another variation to the design is shown in FIG. 8 where a different conformable material 820 is added in the compartment, the conformable material 820 being a smoother, more conformable, less wetting material, as compared to the conformable material 802 (conformable material 1) surrounding the injection/vacuum ports and the field in between the injection port 806 and the vacuum port 808 ports. FIG. 8 represents a same view of the bottom of the injection head housing (here injection head housing 809) as FIGS. 6 and 7. By way of example only, the conformable material 802 might be solid silicone rubber, while the conformable material 820 can be closed cell silicone sponge, which is smoother and more pliant or pliable than solid silicone rubber. Being more pliable, the conformable material 820 in the field between the injection port 806 and the vacuum port 808 will have less stress (as compared to the conformable material 802) thereby concentrating the stress on the conformable material 802 around the injection port 806 and the vacuum port 808.

The conformable material/low friction material configurations depicted in FIGS. 6-8 can be employed in accordance with any of the injection head designs described herein. In particular, the injection head design provided in FIG. 4 where the filter is disposed downstream from the bottom of the head would significantly benefit from these configurations to concentrate stress on the ports and the field therebetween.

As described above, it is important to accurately monitor how the vacuum force changes with time as the filter traps solder. A change in the vacuum can produce poor soldering patterns. Thus, it would be desirable to know as soon as possible that the injection head is beginning to clog.

One could simply monitor the instantaneous vacuum with an absolute pressure sensor. An absolute pressure sensor would measure the difference in pressure between the vacuum line entering the injection head and the atmosphere pressure. Instantaneous vacuum means the pressure at a given point in time as opposed to, for example, a record of the pressure history. This approach, however, has some notable drawbacks.

For instance, of primary concern are small deviations from the optimal vacuum pressure, i.e., changes in the vacuum pressure of a fraction of a Torr at ~10 Torr. An absolute vacuum gauge requires an upper bound on the dynamic range of at least one atmosphere, 760 Torr. This means that an adequate absolute vacuum gauge must have a large enough dynamic range to capture an upper bound of at least 760 Torr and a lower bound of ~10 Torr with a sensitivity of 1 Torr. It is much easier and more precise to find a differential vacuum gauge that focuses on a small pressure range while maintaining the required sensitivity.

Also, with an absolute vacuum gauge the pressure difference between the atmospheric pressure and vacuum inlet going into the injection head is measured. However, the system vacuum pressure and the atmospheric pressure can vary as a function of time. The natural variation in the system vacuum pressure and the atmospheric pressure make it difficult to determine what changes are due to injection head vacuum variation (due, for example, to clogging of the filter—which is of interest), as opposed to system vacuum variation and/or atmospheric variation.

Also, it would be desirable to retain (in a log) the injection head vacuum changes rather than simply providing an instantaneous absolute pressure value. Namely, one would ideally like to monitor how the vacuum pressure changes as a function of time and then use this data to learn when the injection head is about to clog.

Advantageously, the present techniques employ a differential vacuum gauge to measure a difference in the system vacuum pressure and the local vacuum pressure at the injection head. See FIG. 9 (cross-sectional view). For illustrative purposes only, the injection head 100 design of FIG. 1 is used in the present example, and like structures are numbered alike in the drawings and in the following description. Differential vacuum pressure gauges are commercially available, for example, from Honeywell International Inc., Morris Plains, N.J. In general, a differential vacuum pressure gauge measures the difference in vacuum pressure between two points. By way of example only, the differential vacuum gauge 902 can have two input ports one, in this case connected to vacuum port 110 at the injection head (which registers the head vacuum 908 and the other connected to a system vacuum 910. Monitoring just the changes between the injection head and the system advantageously circumvents any issues with varying system vacuum and changes in atmospheric pressure.

Figure 9:
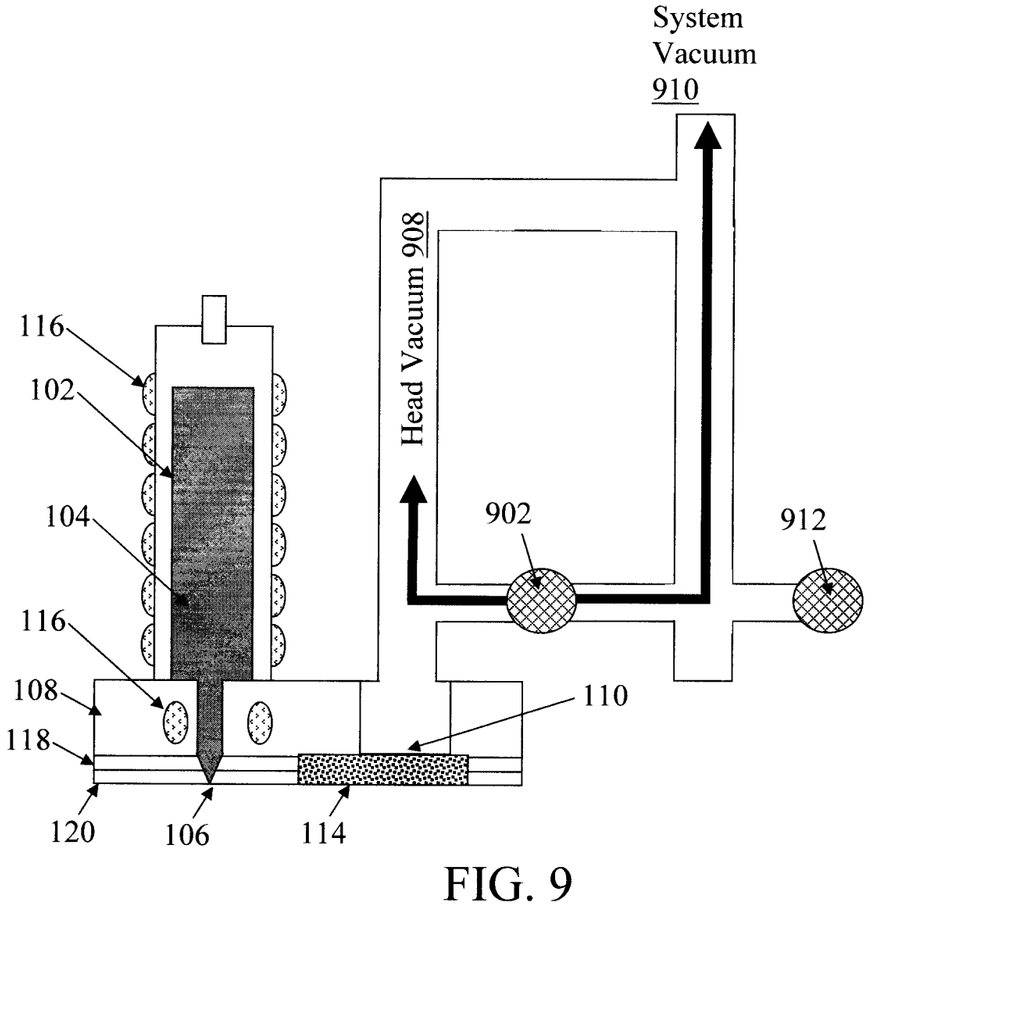
FIG. 9 is a diagram illustrating a differential vacuum gauge connected to the vacuum port and to the vacuum source to measure a difference in the system vacuum pressure and the pressure at the injection head according to an embodiment of the present invention.

Specifically, as shown for example in FIG. 9, the injection head vacuum 908 can be provided by running a tee off of the system vacuum 910 to the vacuum port 110 of the injection head. A differential vacuum gauge 902 is present just downstream from the vacuum port 110. The differential vacuum gauge 902 has two inputs: 1) the vacuum pressure at the vacuum port, i.e., head vacuum 908 and 2) the system vacuum 910. The differential vacuum gauge 902 will mechanically derive the vacuum pressure difference between these two inputs.

Another benefit of using a differential vacuum gauge is that a correctly sized differential gauge should have higher resolution in the desired injection head vacuum range that needs to be monitored. Also, if absolute pressure is required for some reason, an absolute vacuum gauge can be added anywhere in the vacuum pathway. See, for example, FIG. 9 where an absolute vacuum gauge 912 is also present. In that case, the absolute vacuum pressure at the injection head is simply the difference between the absolute vacuum gauge 912 and the differential vacuum gauge 902.

It is also desirable to continuously monitor and log the vacuum pressure at the injection head, as well analyze the injection vacuum head history. This data can be used to train a monitoring program that can then alert a user when the injection head vacuum pressure is out of range and, for example, the filter needs to be cleaned or replaced. See methodology 1100 of FIG. 11, described below.

Figure 10:
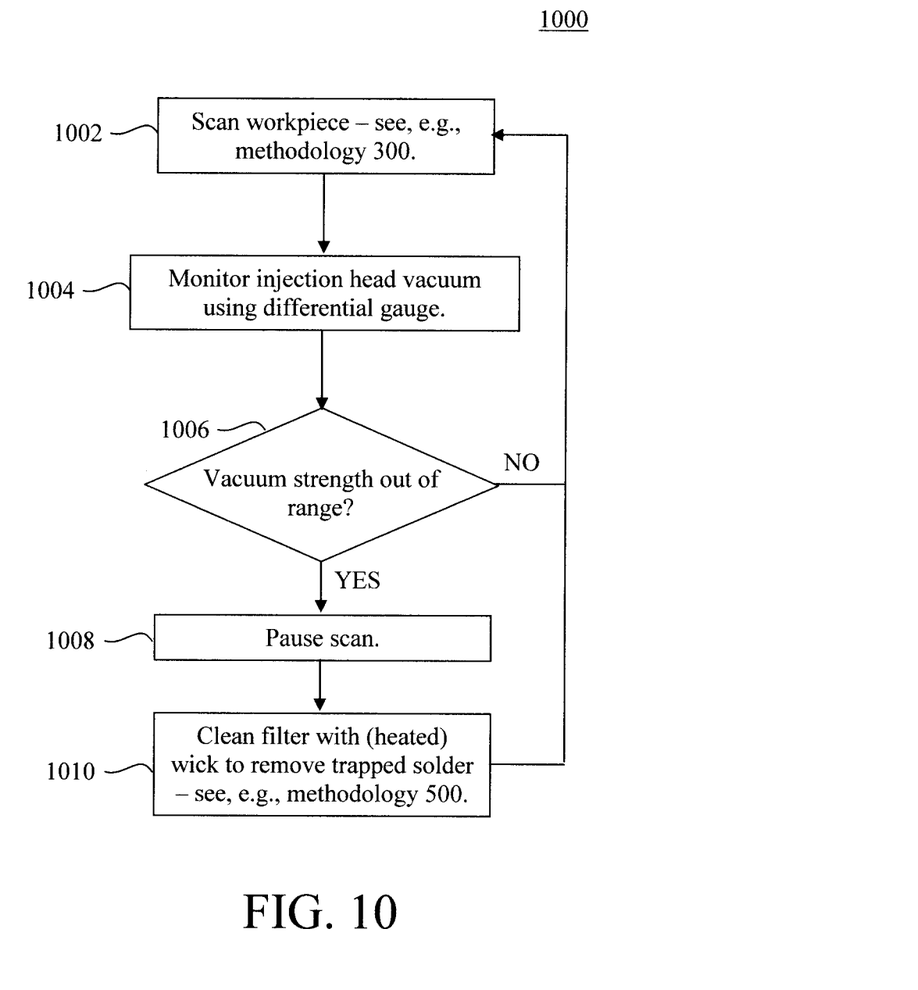
FIG. 10 is a diagram illustrating an exemplary methodology for molten solder injection while monitoring vacuum strength according to an embodiment of the present invention.

FIG. 10 is a diagram illustrating an exemplary methodology 1000 for molten solder injection that leverages the injection head designs and techniques for use thereof that were described in detail above. In step 1002, the injection head is scanned across the surface of a workpiece. The work piece surface has features (such as vias) present therein and, as described above, during scanning the feature is evacuated first by the vacuum port and then filled with molten solder as the injection port passes over it. See, for example, methodology 300 of FIG. 3, described above.

During scanning the vacuum pressure at the vacuum port is monitored using the above-described differential vacuum pressure gauge (see step 1004), and in step 1006 a determination is made as to whether the vacuum strength is out of range. For instance, as will be described in conjunction with the description of FIG. 11 below, a monitoring program can be trained using historical/logged vacuum pressure data to establish a suitable vacuum strength range for different solder fill properties.

If it is determined in step 1006 that (NO) the vacuum strength is not out of range, then scanning is continued (as per step 1002) while continuously monitoring the vacuum strength (as per step 1004). On the other hand, if it is determined in step 1006 that (YES) the vacuum strength is out of range (e.g., the vacuum strength is low due to clogging of the filter), then in step 1008 the scan is paused and in step 1010 the filter is cleaned. As described in accordance with the description of methodology 500 of FIG. 5 above, the filter can be cleaned by contacting the filter with a heated solder wick to thereby transfer solder from the filter to the (heated) wick. Once the filter has been cleaned, the scanning can continue (as per step 1002) while continuously monitoring the vacuum strength (as per step 1004).

Figure 11:
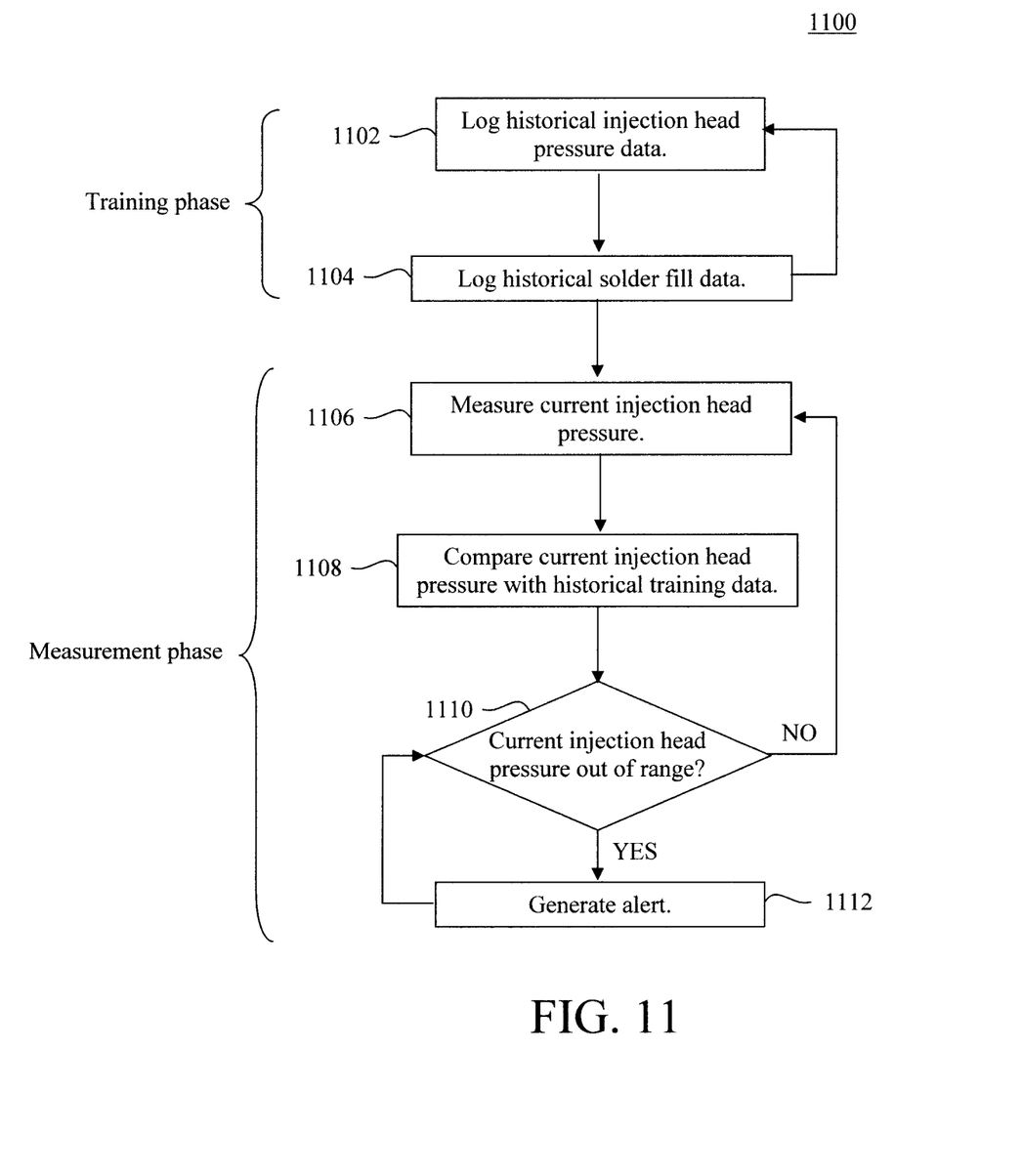
FIG. 11 is a diagram illustrating an exemplary methodology for monitoring of the vacuum pressure at the injection head according to an embodiment of the present invention.

As provided above, it is preferable to track or log vacuum pressure data in order to learn when the filter is about to become clogged, so that the filter can then cleaned (or replaced) before a faulty product is produced (due to excessively low vacuum). In that regard FIG. 11 illustrates an exemplary methodology 1100 for intelligent monitoring of the vacuum pressure at the injection head. Methodology 1100 represents one exemplary embodiment for performing step 1004 of methodology 1000 (of FIG. 10) for monitoring the injection head vacuum using a differential vacuum pressure gauge.

Initially, the recorded vacuum injection head pressure data from the differential vacuum pressure sensor (obtained in step 1102) along with a degree of solder fill data (obtained in step 1104) are used teach/train the monitoring program what is an acceptable injection head vacuum strength window/range. By way of example only, this training phase can include data relating the percent the features are filled with molten solder at different vacuum strengths, e.g., the features are 50% filled at X Torr, 75% filled at Y Torr, and 100% filled at Z Torr, wherein X<Y<Z.

Once the system is trained what to look for, a measurement phase begins whereby the current injection head vacuum pressure is measured (step 1106) and compared with the historical training data (step 1108). In step 1110, a determination is made as to whether the current injection head vacuum pressure is out of range. If it is determined in step 1110 that (NO) the current injection head vacuum pressure is not out of range, then the measurement phase in reiterated at step 1106. On the other hand, if it is determined in step 1110 that (YES) the current injection head vacuum pressure is out of range, then an alert is generated (step 1112).

The alert is intended to get a user's attention so that the user can take action to address the drop in vacuum pressure before the system malfunctions, e.g., by cleaning or replacing the filter. Thus, if methodology 1100 is being performed by a computer-based monitoring system (see, for example, FIG. 12—described below, then a visible alert and/or an audible alarm can be generated. Further, data can be presented to the user (for example on a monitor or other suitable display) showing the current vacuum pressure data and/or historical data and feature fill properties.

Figure 12:
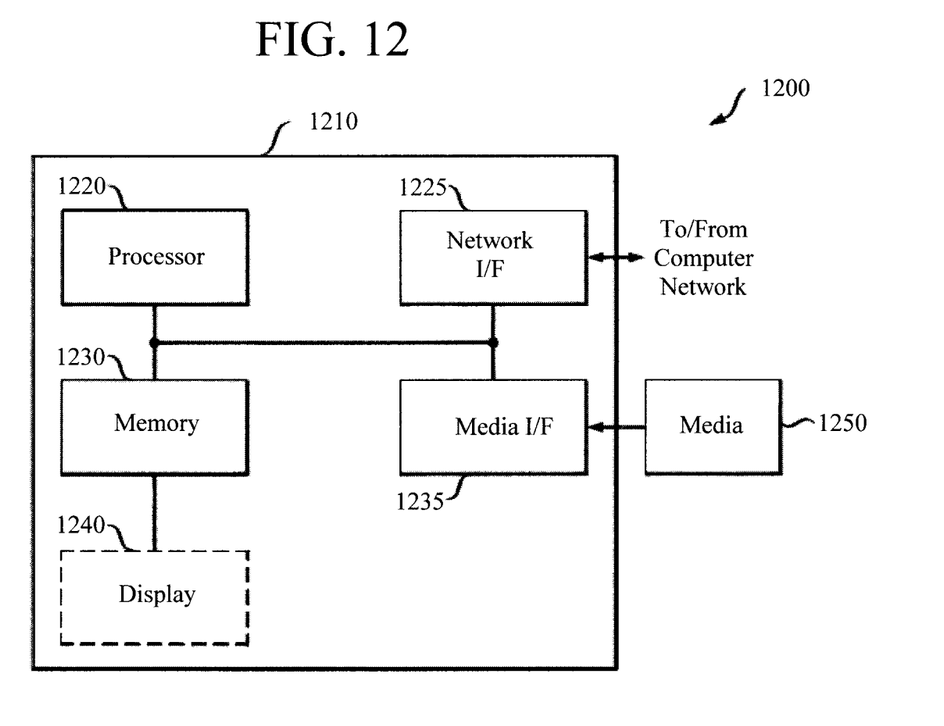
FIG. 12 is a diagram illustrating an exemplary apparatus that can be configured to implement one or more of the methodologies presented herein according to an embodiment of the present invention.

Turning now to FIG. 12, a block diagram is shown of an apparatus 1200 that can be configured to perform one or more of the methodologies presented herein. For example, apparatus 1200 can be configured to perform the steps of methodology 1100 (of FIG. 11) described above. Apparatus 1200 includes a computer system 1210 and removable media 1250. Computer system 1210 includes a processor device 1220, a network interface 1225, a memory 1230, a media interface 1235 and an optional display 1240. Network interface 1225 allows computer system 1210 to connect to a network, while media interface 1235 allows computer system 1210 to interact with media, such as a hard drive or removable media 1250.

Processor device 1220 can be configured to implement the methods, steps, and functions disclosed herein. The memory 1230 could be distributed or local and the processor device 1220 could be distributed or singular. The memory 1230 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1220. With this definition, information on a network, accessible through network interface 1225, is still within memory 1230 because the processor device 1220 can retrieve the information from the network. It should be noted that each distributed processor that makes up processor device 1220 generally contains its own addressable memory space. It should also be noted that some or all of computer system 1210 can be incorporated into an application-specific or general-use integrated circuit.

Optional display 1240 is any type of display suitable for interacting with a human user of apparatus 1200. Generally, display 1240 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. An injection head, comprising:
a reservoir;
an injection port on a bottom of the injection head connected to the reservoir;
a vacuum port adjacent to the injection port on the bottom of the injection head connected to a vacuum source, wherein the vacuum port is offset from the injection port such that the injection head has straight vertical sidewalls exposed on opposite sides of the reservoir at an exterior of the injection head;
a differential vacuum gauge connected to the vacuum port and to the vacuum source;
multiple heaters arranged side-by-side one another on the exterior of the injection head along the straight vertical sidewalls on the opposite sides of the reservoir;
a filter disposed between the injection port and the vacuum source at a workpiece surface, the filter comprising a heat-resistant material with a porous microstructure that allows air flow but prevents molten solder from flowing therethrough, wherein the filter is disposed on the bottom of the injection head next to the injection port such that the vacuum port is adjacent to a top surface of the filter and the injection port is adjacent to a side of the filter that is perpendicular to the top surface of the filter;
a first material, which is conformable, disposed on the bottom of the injection head;

a second material, which reduces friction as the injection head is moved over the workpiece surface, disposed on the first material, wherein the first material and the second material have a same outer footprint as the bottom of the injection head and surround both the injection port and the filter to provide a bottommost surface of the injection head that is flat, with a portion of the first material and the second material separating the injection port from the filter along the bottommost surface of the injection head, and wherein the filter is in direct contact with the first material and the second material and separates the vacuum port from the first material and the second material; and a computer-based monitoring system having a processor device, connected to a memory, and a user interface, wherein the computer-based monitoring system is configured to display on the user interface a current vacuum pressure from the differential vacuum gauge along with feature fill properties that specify a percent that workpiece features are filled with solder at different vacuum strengths.

2. The injection head of claim 1, wherein the reservoir comprises the molten solder.

3. The injection head of claim 1, wherein the filter covers the vacuum port.

4. The injection head of claim 3, wherein vacuum port has a width W1 and the filter has a width W2, wherein W2>W1.

5. The injection head of claim 1, wherein the filter is selected from the group consisting of: a ceramic filter, a polymer filter, a glass filter, and a metal filter.

6. The injection head of claim 1, wherein the injection port and the vacuum port comprise parallel rectangular slots along the bottom of the injection head.

7. The injection head of claim 1, wherein the filter is coplanar with the injection port along the bottom of the injection head.

8. The injection head of claim 1, wherein the injection port has an inverted triangular shape at the bottom of the injection head.

9. The injection head of claim 1, wherein a surface of the filter is coplanar with a surface of the second material to provide the bottommost surface of the injection head that is flat.

10. The injection head of claim 1, wherein the heat-resistant material of the filter comprises a porous copper block having a pore size of from about 10 micrometers to about 50 micrometers.

11. The injection head of claim 1, wherein the heat-resistant material of the filter comprises interwoven glass or ceramic fibers.

12. The injection head of claim 1, wherein the top surface of the filter is in contact with the bottom of the injection head to either side of the vacuum port with the filter covering the vacuum port, wherein the filter has a thickness that is equivalent to a combined thickness of the first material and the second material such that a bottom surface of the filter is coplanar with a bottom surface of the second material and whereby, with the filter covering the vacuum port, the first material and the second material are absent from an area adjacent to the vacuum port, and wherein the injection port has an inverted triangular shape in only the first material and the second material adjacent to the filter.

13. The injection head of claim 1, wherein the injection port and the vacuum port are present in a same housing of the injection head with the injection port and the vacuum port both facing a same side of the workpiece surface, and wherein the filter extends laterally between the injection port and the vacuum port along the workpiece surface.

14. The injection head of claim 1, wherein the computer-based monitoring system is configured to compare the current vacuum pressure with historical data comprising historical injection head pressure data and historical solder fill data, and generate an alert whenever the current vacuum pressure is out of range.

15. The injection head of claim 14, wherein the computer-based monitoring system is configured to display the historical data on the user interface.

* * * * *